2,832,782

ANTIFUNGAL AGENT

Joseph Thomas Alberi, Red Lodge, Mont., assignor to Bristol Laboratories Inc., Syracuse, N. Y., a corporation of New York No Drawing. Application June 4, 1956
Serial No. 589,014

2 Claims. (Cl. 260—256.4)

This invention relates to a novel antifungal agent useful in the treatment of plant infections and the removal of fungal growth from textiles and food and in counteracting the overgrowth of *Candida albicans* observed during tetracycline therapy and relates more particularly to orotic acid hydrazide.

The following example is given to illustrate the scope of this invention without limiting it thereto.

*Example*

The methyl ester of orotic acid (6.2 g.; see page 708 of the sixth edition of the Merck Index) was suspended in 250 ml. absolute methanol and 2.6 g. hydrazine hydrate was added. The mixture was refluxed five hours and cooled in an ice-bath. Crystalline orotic acid hydrazide precipitated and was collected by filtration, recrystallized from 80% methanol and found to melt at 285°–287° C.

*Analysis.*—Calc'd for $C_5H_6O_3N_4$: C, 35.29; H, 3.53; N, 32.93. Found: C, 35.4; H, 3.89; N, 33.05.

Like other hydrazides, orotic acid hydrazide forms acid addition salts which are included within the scope of the present invention. For therapeutic use, these include non-toxic acid addition salts with organic and inorganic acids, e. g. the hydrochloride, hydrobromide, hydroiodide, sulfate, phosphate, maleate, acetate, citrate, oxalate, succinate, benzoate, tartrate, fumarate, mandelate, malate, ascorbate and the like. For non-therapeutic purposes, use is made of toxic acids such as arsenic acid, etc. The salts are prepared by mixing one equivalent of orotic acid hydrazide and one equivalent of acid, e. g. in solution in warm methanol.

I claim:

1. A compound selected from the group consisting of orotic acid hydrazide and acid addition salts of orotic acid hydrazide.

2. Orotic acid hydrazide.

References Cited in the file of this patent

Beilstein, vol. 25, 1st Supp., page 583.
Shriner and Fuson: Identification of Organic Cmpd. (3rd ed.), page 184.
Wieland: Hydrazine (1913), page 180.